W. T. MORRISON.
RETURN ENVELOP.
APPLICATION FILED NOV. 17, 1906.

932,715.

Patented Aug. 31, 1909.
3 SHEETS—SHEET 1.

Witnesses:

Inventor
William T. Morrison
by attorneys

W. T. MORRISON.
RETURN ENVELOP.
APPLICATION FILED NOV. 17, 1906.

932,715.

Patented Aug. 31, 1909.
3 SHEETS—SHEET 2.

Witnesses:
Gustave Browne
Henry Thieme

Inventor
William T. Morrison
by attorneys

W. T. MORRISON.
RETURN ENVELOP.
APPLICATION FILED NOV. 17, 1906.

932,715.

Patented Aug. 31, 1909.

3 SHEETS—SHEET 3.

Witnesses:
Gustave Browne.
Henry Thieme.

Inventor
William T Morrison
by attorneys
Thomas Seward

UNITED STATES PATENT OFFICE.

WILLIAM T. MORRISON, OF NEW YORK, N. Y.

RETURN-ENVELOP.

932,715.

Specification of Letters Patent.  Patented Aug. 31, 1909.

Application filed November 17, 1906. Serial No. 343,863.

*To all whom it may concern:*

Be it known that I, WILLIAM T. MORRISON, a citizen of the United States, and resident of the borough of Bronx, in the city and State of New York, have invented a new and useful Improvement in Return-Envelops, of which the following is a specification.

The object of this present invention is to provide a return envelop which is so constructed that an additional covering for the front of the envelop is provided, said covering being so arranged that a transparent portion in the front of the envelop is exposed at all times to bring into view the name of the sendee when the envelop is used for its first passage through the mail and the name of the sendee for the second passage of the envelop through the mail, it being understood that the letter sheet to be used in connection with the envelop has thereon the two addresses above mentioned arranged in such position that the letter sheet can be folded to disclose either the one or the other of the addresses through the transparent portion of the envelop.

A further object is to provide this additional covering which is intended to receive the stamp and postmark for the first passage of the envelop through the mail, with a sealing flap for securely sealing the envelop without utilizing the envelop flap, which envelop flap is used for sealing after the covering with its stamp, postmark and sealing flap have been removed.

Practical embodiments of my invention are represented in the accompanying drawings in which—

Figure 1:
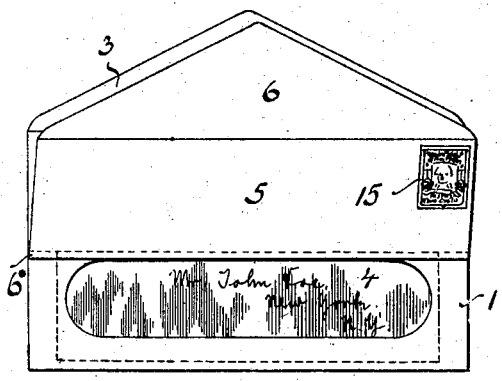
Figure 2:
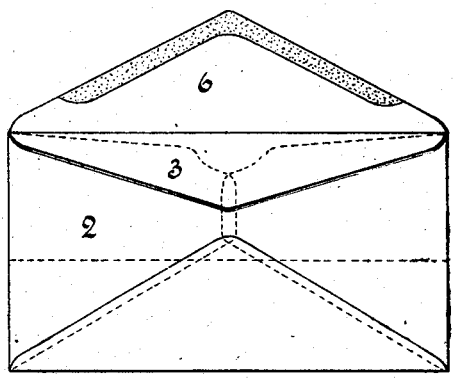
Figure 3:
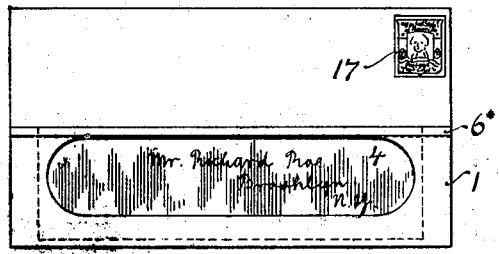
Figure 4:
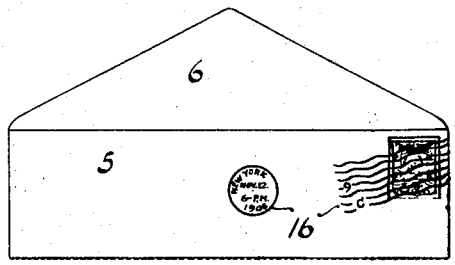
Figure 5:
Figure 6:
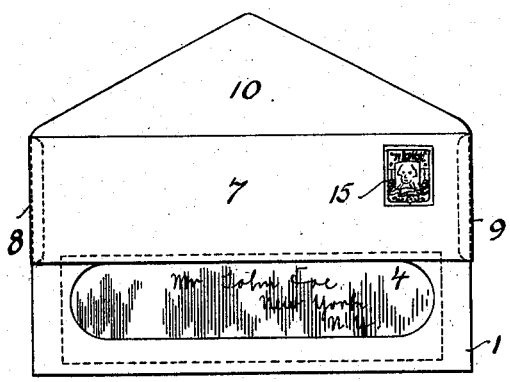
Figure 7:
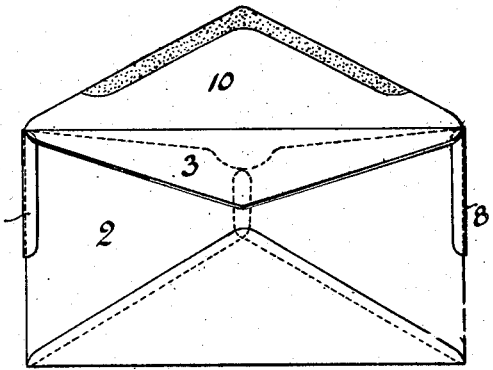
Figure 8:
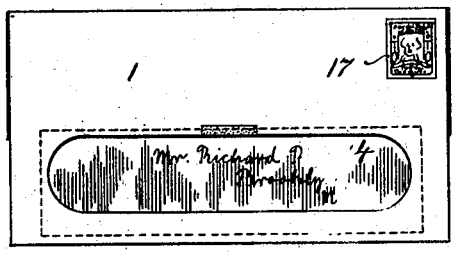
Figure 9:
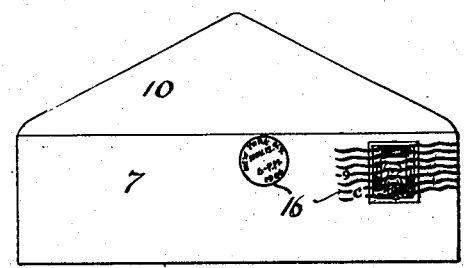
Figure 10:
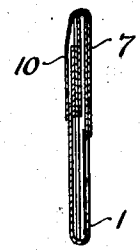
Figure 11:
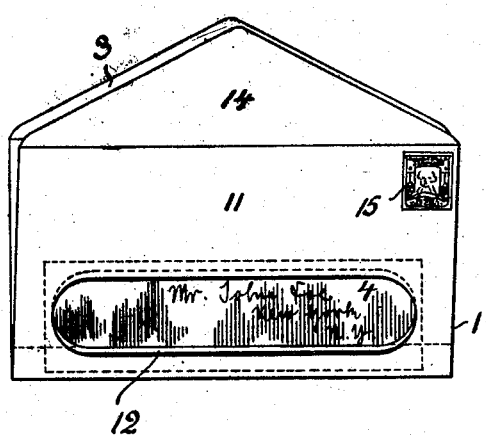
Figure 12:
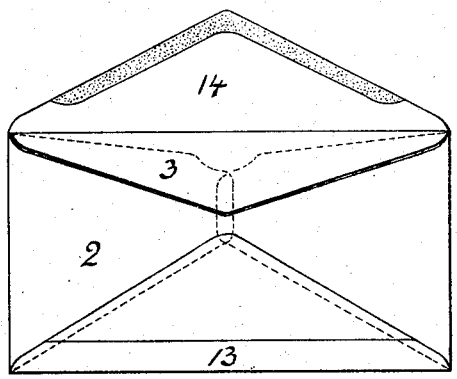
Figure 13:
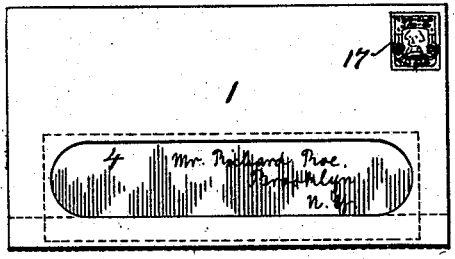
Figure 14:
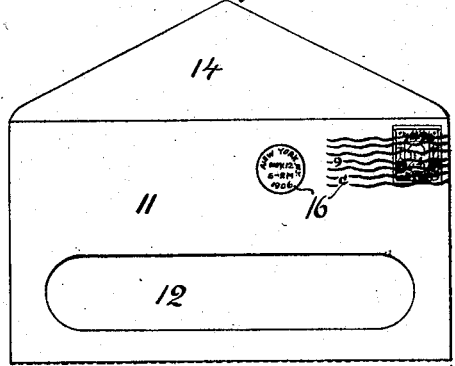
Figure 15:
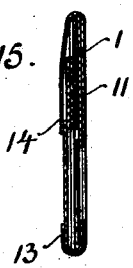

Figure 1 is a front view of one embodiment of my improved return envelop showing the sealing flaps of the covering and envelop unfolded, Fig. 2 is a back view of the same, showing the envelop flap folded and the covering flap unfolded, Fig. 3 is a front view with the covering detached, Fig. 4 is a front view of the covering, and Fig. 5 is a transverse section through the return envelop showing the positions which the parts assume when the envelop is sealed ready for its first passage through the mail, the envelop sealing flap being tucked into the envelop and the sealing flap of the covering being secured to the back of the envelop. Fig. 6 is a front view of a modified form of return envelop with the sealing flap of the covering unfolded, Fig. 7 is a back view of the same. Fig. 8 is a front view of the envelop with the covering detached, Fig. 9 is a front view of the covering, and Fig. 10 is a transverse section through the return envelop showing the positions which the parts assume when the envelop is sealed ready for its first passage through the mail, the envelop sealing flap being tucked into the envelop and the sealing flap of the covering being secured to the back of the envelop. Fig. 11 is a front view of a third form of my invention with the sealing flaps of the covering and envelop unfolded, Fig. 12 is a back view with the sealing flap of the envelop folded and the sealing flap of the covering unfolded. Fig. 13 is a front view of the envelop with the covering detached. Fig. 14 is a view of the covering and Fig. 15 is a transverse section through the return envelop showing the positions which the parts assume when the envelop is sealed ready for its first passage through the mail, the envelop sealing flap being tucked into the envelop and the sealing flap of the covering being secured to the back of the envelop.

In all of the forms the front of the envelop is denoted by 1, the back by 2 and the sealing flap by 3. The front of the envelop is provided with a transparent portion 4 through which the name of the sendee on the letter sheet is exposed for the first passage of the envelop through the mail by folding the letter sheet in one manner and the name of the sendee is exposed for the second passage of the envelop through the mail by folding the letter sheet in another manner.

Three different forms of coverings are illustrated. In the form shown in Figs. 1 to 5 inclusive, the covering 5 is detachably secured to the front 1 of the envelop along the line 6* just above the transparent portion 4. This covering 5 is provided with a sealing flap 6 arranged to fold over and be attached to the back 2 of the envelop after the letter sheet has been folded within the envelop and the envelop flap 3 has been tucked into the said envelop.

In the form shown in Figs. 6 to 10 inclusive, the covering 7 extends across the front 1 of the envelop above the transparent portion 4 and is detachably secured to the side edges of the envelop as shown at 8 and 9, by folding the ends of the covering 7 over on to the back 2 of the envelop and securing them thereto. The sealing flap of the covering 7 is denoted by 10.

In the form shown in Figs. 11 to 15 inclusive, the covering 11 extends across the entire front 1 of the envelop and it is provided with an opening 12 therein through which the transparent portion 4 of the envelop is disclosed. In this form the covering 11 is detachably secured along the bottom edge of the envelop by providing the covering 11 with a flap 13 folded over and secured to the back 2 of the envelop. The sealing flap of the covering 11 is denoted by 14.

In all of the forms the stamp 15 for use in sending the return envelop for the first time through the mail is secured to the front of the covering. The letter sheet is folded to disclose through the transparent portion 4 of the envelop, the name of the sendee for the first passage of the envelop through the mail, the envelop flap 3 is then tucked into the envelop and the sealing flap of the covering is folded over and secured to the back 2 of the envelop. For using the envelop for the second time the covering is detached from the envelop, thus removing the stamp 15 and the postmark 16. A stamp 17 may then be secured to the front 1 of the envelop. The letter sheet may then be folded to disclose through the transparent portion 4, the name of the sendee for the second passage of the envelop through the mail. The sealing flap 3 of the envelop may then be folded over and attached to the back 2.

In the forms herein set forth it will be seen that a return envelop is provided in which the letter sheet is disclosed for the first and second passages of the envelop through the mail, thus obviating the necessity of writing or printing an address on the envelop for either of the passages through the mail, means at the same time being provided for removing all traces of the postmark and canceled stamp of the first passage of the envelop through the mail.

What I claim is:

1. The combination with a return envelop having a letter sheet address disclosing portion in its front, of a covering detachably secured to the envelop in such a position that it will expose the said address disclosing portion during the first passage of the envelop through the mail.

2. The combination with a return envelop having a letter sheet address disclosing portion in its front, of a covering detachably secured to the envelop in such a position that it will expose the said address disclosing portion during the first passage of the envelop through the mail, the said covering having a sealing flap arranged to fold over and be secured to the back of the envelop.

In testimony, that I claim the foregoing as my invention, I have signed my name in presence of two witnesses, this 15th day of November 1906.

WILLIAM T. MORRISON.

Witnesses:
  FREDK. HAYNES,
  LIDA M. EGBERT.